(12) United States Patent
Enderlein et al.

(10) Patent No.: US 10,514,533 B2
(45) Date of Patent: Dec. 24, 2019

(54) METHOD FOR CREATING A MICROSCOPE IMAGE, MICROSCOPY DEVICE, AND DEFLECTING DEVICE

(71) Applicant: Georg-August-Universitaet Goettingen Stiftung Oeffentlichen Rechts, Goettingen (DE)

(72) Inventors: Joerg Enderlein, Goettingen (DE); Ingo Gregor, Kreuztal (DE)

(73) Assignee: Georg-August-Universitaet Goettingen Stiftung Oeffentlichen Rechts, Goettingen (DE)

( * ) Notice: Subject to any disclaimer, the term of this patent is extended or adjusted under 35 U.S.C. 154(b) by 552 days.

(21) Appl. No.: 15/059,462

(22) Filed: Mar. 3, 2016

(65) Prior Publication Data
US 2016/0246042 A1 Aug. 25, 2016

Related U.S. Application Data

(63) Continuation-in-part of application No. PCT/EP2014/002389, filed on Sep. 3, 2014.

(51) Int. Cl.
*G02B 21/00* (2006.01)
*G02B 26/08* (2006.01)
(Continued)

(52) U.S. Cl.
CPC ....... *G02B 21/0072* (2013.01); *G02B 21/008* (2013.01); *G02B 21/0048* (2013.01);
(Continued)

(58) Field of Classification Search
CPC ............ G02B 21/0072; G02B 26/0833; G02B 21/0048; G02B 21/008; G02B 21/0076; G02B 27/141; H04N 5/372; H04N 5/2256
(Continued)

(56) References Cited

U.S. PATENT DOCUMENTS

| 2001/0030290 A1* | 10/2001 | Stern | C12Q 1/6834 250/458.1 |
| 2004/0032650 A1* | 2/2004 | Lauer | G02B 21/004 359/385 |

(Continued)

FOREIGN PATENT DOCUMENTS

| DE | 696 20 613 T2 | 11/2002 |
| DE | 10 2012 101 344 A1 | 8/2013 |

(Continued)

OTHER PUBLICATIONS

Roth et al.; "Optical Photon Reassignment Microscopy (OPRA)"; Optical Nanoscopy, vol. 2, No. 5, 2013, entire article.

*Primary Examiner* — Stephone B Allen
*Assistant Examiner* — Rahman Abdur
(74) *Attorney, Agent, or Firm* — W&C IP

(57) ABSTRACT

A method for creating a microscope image of an object includes emitting excitation light, illuminating points on the object in a rastering manner, and detecting a raster partial image of a predetermined magnification for each illuminated point. An optical sensor detects emission light from the object excited by the excitation light. Distances between pairs of raster partial images correspond to distances of the illumination points multiplied by a correction factor. A microscopy device includes a light source, a rastering device, an optical sensor, and a deflecting device for deflecting the emission light. The deflecting device feeds excitation light passing through an inlet to the rastering device, light deflected at the rastering device to a first outlet, and emission light passing through the first outlet to the rastering device such that the emission light is deflected from the optical axis in the same direction as the excitation light.

6 Claims, 9 Drawing Sheets

Figure 1:
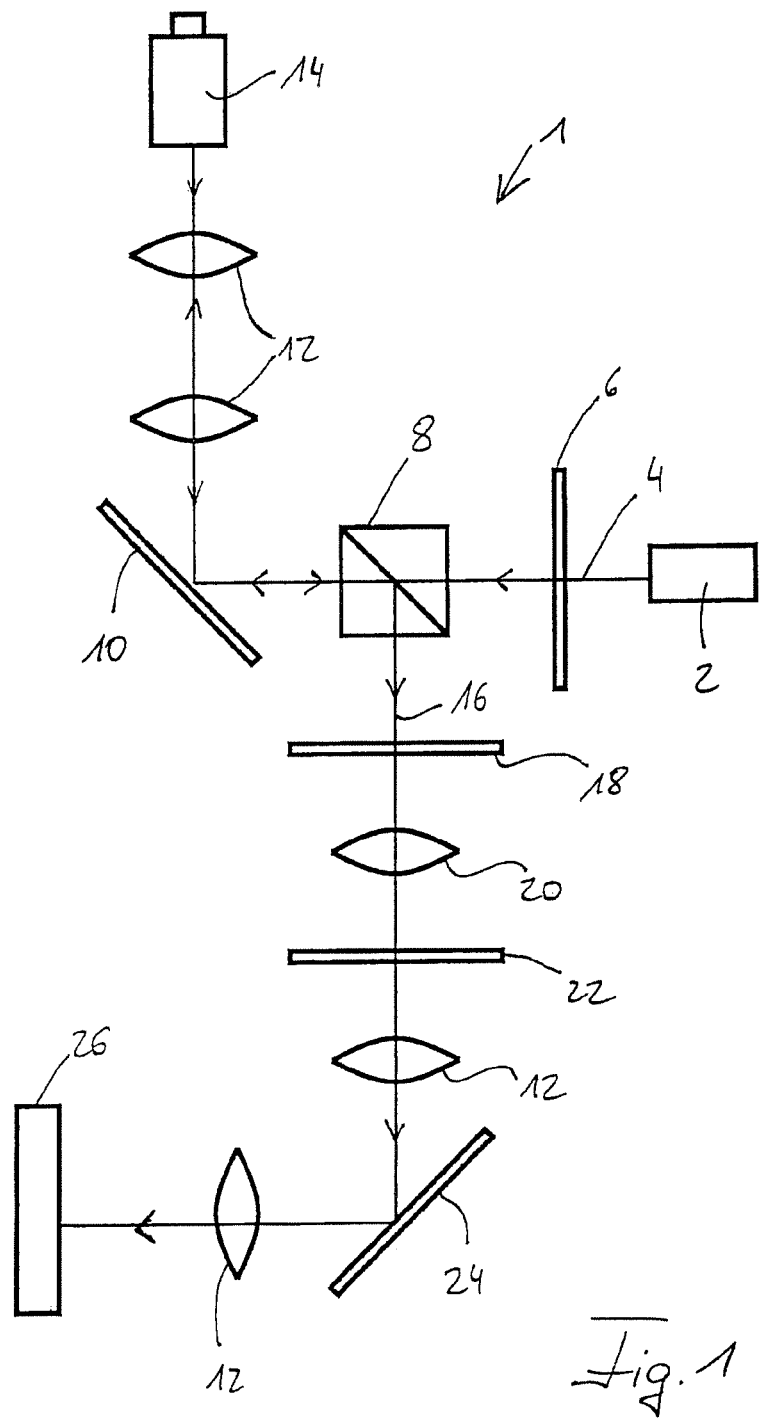

(51) Int. Cl.
  *H04N 5/225*   (2006.01)
  *H04N 5/372*   (2011.01)
  *G02B 27/14*   (2006.01)

(52) U.S. Cl.
  CPC ..... *G02B 21/0076* (2013.01); *G02B 26/0833* (2013.01); *H04N 5/2256* (2013.01); *H04N 5/372* (2013.01); *G02B 27/141* (2013.01)

(58) Field of Classification Search
  USPC .......................................................... 359/368
  See application file for complete search history.

(56) References Cited

U.S. PATENT DOCUMENTS

| | | | | |
|---|---|---|---|---|
| 2008/0309929 | A1* | 12/2008 | Christiansen | G01N 21/276 356/243.1 |
| 2009/0040516 | A1* | 2/2009 | Fritz | G01J 3/02 356/301 |
| 2010/0059696 | A1 | 3/2010 | Heintzmann et al. | |
| 2013/0093873 | A1* | 4/2013 | Bula | G02B 21/0048 348/79 |

FOREIGN PATENT DOCUMENTS

| | | | |
|---|---|---|---|
| DE | 102013005927 A1 | 10/2014 | |
| EP | 2 317 362 A1 | 5/2011 | |
| WO | 92/17806 | 10/1992 | |
| WO | WO 92/17806 * | 10/1992 | ............. G02B 21/00 |
| WO | WO 9217806 A1 * | 10/1992 | ......... G02B 21/0032 |
| WO | 2014072049 A1 | 5/2014 | |

* cited by examiner

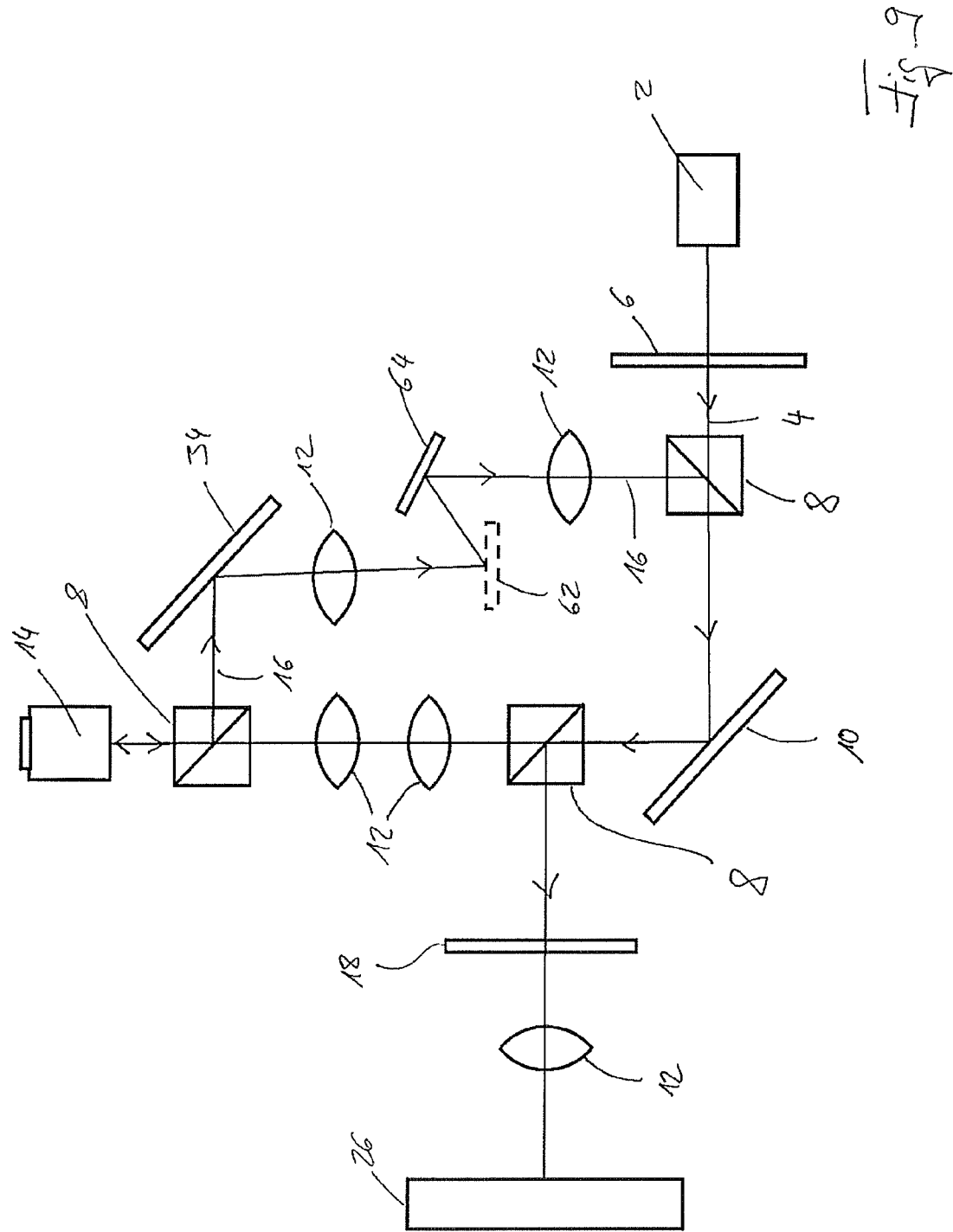

METHOD FOR CREATING A MICROSCOPE IMAGE, MICROSCOPY DEVICE, AND DEFLECTING DEVICE

DESCRIPTION

The invention relates to a method for creating a microscope image of at least part of an object, wherein the method comprises the following steps:
a) emission of excitation light with an excitation wavelength by a light source,
b) scanning illumination of a plurality of illumination spots at the object by way of the excitation light, which illumination spots have a predetermined arrangement with predetermined distances between one another,
c) detection of a scanning partial image with a predetermined magnification for each illuminated illumination spot by guiding emission light with an emission wavelength to an optical sensor, which emission light is emitted at the respective illumination spot by the object as a reaction to the illumination with excitation light.

Instead of "scanning illumination" one could also use the expression "rasterized illumination" and a "scanning partial image" can also be called "raster partial image" or " partial raster image". In the following instead of "scanning " one can also use the impression "rasterizing".

The invention moreover relates to a microscopy apparatus for carrying out such a method.

Optical microscopy and, in particular, high-resolution optical microscopy find use in many areas of the natural sciences, in particular in the field of the so-called "life sciences". The two main features of an optical microscope in this case are the magnification and spatial resolution thereof. While the numerical magnification can be set to virtually any magnitude by means of appropriate lens systems, it was already shown in the 19th century that the resolution of an optical microscope is, as a matter of principle, delimited by the diffraction of light. Abbe's famous resolution limit in this case relates to so-called wide-field microscopes, in which an image of the object to be observed is imaged on a wide-field detector, for example the human eye or a CCD camera, by way of the microscope.

In order to be able to observe ever-smaller structures, it is of great interest to improve the resolution of optical microscopes. To this end, various approaches are known from the prior art.

One option for achieving significant improvement in the spatial resolution consists of the so-called 4Pi microscopy, in which the object to be observed is irradiated by two opposing objectives with two mutually coherent lasers and the emission light emitted by the object is collected by both objectives and focused in a coherently superposed manner on a detector. By way of example, such a microscope is described in US RE 38,307 E.

Interestingly, the lateral and axial resolution can be improved if the sample is illuminated by a periodically structured illumination ("structured illumination microscopy SIM"). By way of example, this can be a light grid, which can be generated in various ways. If the object was illuminated by the periodically structured illumination, different wide-field images are recorded in the case of different relative arrangements and orientations between the structured illumination pattern and the objective. Using complicated numerical algorithms, a final image with a spatial resolution that is improved by a factor of approximately 2 in all spatial directions can be calculated from these different wide-field images. By way of example, such a system is described in DE 696 20 613 T2. However, it is disadvantageous that, firstly, it is necessary to record a multiplicity of separate wide-field images and that, secondly, a complicated numerical algorithm is required to calculate the final image from these wide-field images. The production of corresponding images is consequently time-consuming and therefore expensive. In the case of structured illumination microscopy, the individual images to be recorded must be created in a complicated manner since, in particular, the light grid must be positioned exactly on the sample, it must possibly be displaced and rotated by angles which were fixedly defined in advance and which are to be observed as exactly as possible.

In addition to the so-called wide-field microscopy, the prior art has also disclosed laser scanning microscopes, in which the object to be observed is scanned by means of a diffraction-limited focused laser such that a multiplicity of illumination spots, which are positioned in a well-defined manner with respect to one another, are illuminated on the object by way of the light from the laser. The light intensity of the emission light cast back by the object is registered as a function of the respective scanning position. A "scanning position" can also be called "raster position". These microscopes can likewise have a confocal embodiment and continue to be restricted in the lateral direction by the resolution limit described by Abbe, but likewise enable a spatial resolution in the axial direction. In the literature, confocal laser scanning microscopes are also described as laser scanning confocal microscopes (LSCM). The achievable lateral resolution corresponds approximately to that of a 4Pi microscope.

In the case of confocal microscopy, it is proposed, for example, to focus the emission light collected from the object in the detection beam path by way of a confocal aperture. In the ideal case, a confocal aperture only forwards to the detector that part of the emission light emitted by the object which originates from the focal plane of the objective. As a result of this, the lateral resolution of a confocal microscope still is subject to the resolution limit according to Abbe, but such a confocal microscope now allows a spatial resolution in the axial direction. By way of example, such a method is described in the journal "Optik", 80, number 2 (1988), pages 53-54, "Super-resolution in confocal imaging" by C. J. R. Sheppard. In order to obtain a complete image, the sample must be illuminated in a scanning manner.

In the case of a so-called image-scanning microscope (ISM), the object to be observed is illuminated, like in a conventional LSCM, in a scanning manner at a plurality of illumination spots positioned relative to one another in a well-defined manner. Unlike in the case of an LSCM, a complete image of the region excited by the excitation light is recorded and stored at each one of these illumination spots. Four-dimensional or five-dimensional data records are created, in which two or three dimensions correspond to the position of the laser focus on the sample and two further dimensions correspond to the coordinates of the image recorded at each scanning position. A final image with an increased resolution can likewise be calculated from these data records. The maximum resolution achievable in this manner corresponds exactly to that which is achievable by a structured illumination microscope (SIM). By way of example, such a microscope and a corresponding method are illustrated in EP 2 317 362 A1. By way of example, the method is also described in detail in the article by Müller and Enderlein, "Image Scanning Microscopy", Physical Review Letters, volume 104, 198101 (2010). However, the realization of an ISM described in the article is disadvantageous in that it is very slow. An image of the illuminated region must be recorded for each illumination spot at which the object is illuminated by the excitation light, as a result of which the maximum scanning speed is restricted to the maximum possible readout rate of the employed camera or of the optical sensor. Typically, it lies one to two orders of magnitude below the scanning speeds of modern, commercially available laser scanning microscopes.

By way of example, in order to accelerate the image formation, a multi-focus excitation using a programmable digital mirror system was proposed, as a result of which the ISM frame rate was brought to the order of approximately 1 frame per second (Andrew G. York et al. "Resolution doubling in live, multicellular organisms via multifocal structured illumination microscopy", Nature Methods volume 9, 749-54, January 2012). However, the numerical outlay required for creating or forming a final image is still enormous since a multiplicity of separate scanning partial images still need to be recorded, stored and processed.

Emission light is emitted by the object by illuminating an illumination spot at the object with the excitation light. By way of example, this emission light can have the same wavelength as the excitation light or, particularly for biological applications, it can have an emission wavelength that differs from the excitation wavelength and that was caused, for example, by the excitation of fluorescence. If an emission center, which emits the emission light of the emission wavelength, is situated in the center of the illumination spot, the intensity maximum caused thereby is also situated in the central region of the recorded scanning partial image. However, in the case where the emission center is not arranged in the central region of the illumination spot, the position of the intensity maximum is shifted in the recorded scanning partial image. In order to compensate this, it is necessary to displace the various recorded scanning partial images numerically and subsequently superpose these, with this being referred to as a coordinate reassignment. The prior art has already disclosed how to achieve this reassignment by way of optics, i.e. by the skillful arrangement of hardware elements (S. Roth et al. "Optical Photon Reassignment Microscopy (OPRA)", arXiv: 1306.6230, Jun. 26, 2013). Here, the recorded scanning partial images are reduced optically and subsequently imaged at the original position of the integrated camera. As a result of this, the necessity to subsequently reduce the scanning partial images by means of suitable software is dispensed with. As a result of this, it was possible to greatly improve the image speed by means of which individual images are established. However, the outlay in terms of machines and equipment for carrying out this method is enormous, as a result of which the method, although it becomes quick, becomes complicated and therefore expensive. In the embodiment described by Roth et al., the emission light is descanned by the scanning device. Subsequently, the beam of the emission light is widened and once again guided over the scanning device in this state, wherein, however, a different angle of incidence is used in this case. As a result, the scanning device is used over a significantly larger angular range of the incident light, and so shadowing effects may occur in this case. Moreover, scanning apparatuses which are employable over a large angular range of the incident light are very cost intensive.

The invention is therefore based on the object of further developing a method for forming such a microscope image in such a way that it can be carried out quickly, easily and nevertheless with a very good resolution of the microscope images.

The invention achieves the object addressed by a method in accordance with the preamble of claim 1, which is distinguished by virtue of the fact that the image positions, at which center points of the scanning partial images are detected on the optical sensor, correspond to the arrangement of the corresponding illumination spots on the object, wherein image distances between image positions of in each case two scanning partial images correspond to the distances of the corresponding illumination spots multiplied by the predetermined magnification and by a correction factor a, wherein the correction factor a is greater than 1.

The illumination spots, which are illuminated in a scanning manner at the surface of the object, have a predetermined arrangement with predetermined distances from one another. By way of example, such arrangements can lie on a square grid or a triangular grid, wherein the individual illumination spots can be embodied in an equidistant manner or with different distances. Each of these illumination spots is illuminated by the excitation light during the scanning illumination. In this region, the object is excited to emit emission light with an emission wavelength, which is subsequently detected as scanning partial image. In so doing, the scanning partial images are guided onto the optical sensor, which may be e.g. a CCD camera, in such a way that the sensor itself already carries out the integration over the different illumination spots. However, unlike what is known from the prior art, this does not require each individual scanning partial image to be reduced by optics, as a result of which the outlay in terms of machines for an apparatus for carrying out this method can be significantly reduced. Rather, in a method according to the invention, the non-reduced scanning partial image, which corresponds to an image of the respective illuminated region of the object magnified by the predetermined magnification, is guided to a predetermined spot of the optical sensor. The arrangement of the center points of these scanning partial images, which are referred to as image positions below, in this case corresponds to the arrangement of illumination spots at the object. By way of example, if the illumination spots are situated on a square or triangular grid, the image positions are also arranged on the square or triangular grid. Only the distance between the individual image positions is magnified compared to the distance between the corresponding illumination spots at the object. However, in this case, the distance is not only multiplied by the desired magnification but also, additionally, by a correction factor a, which is greater than 1. In so doing, what the selection of this correction factor achieves is that all scanning partial images recorded thus are focused onto a spot of the optical sensor, which already renders it possible for the optical sensor to carry out the integration, which optical sensor, for example, is the CCD camera. Consequently, the sensor need not be read out after each scanning partial image and the scanning partial images obtained thus need not be stored and processed subsequently; instead, the optical sensor is read out after the end of the scanning illumination, i.e. after all illumination points are illuminated. A raw image is obtained in the process, which can subsequently be processed, as is known per se from the prior art.

In this context, it turned out to be advantageous if the excitation wavelength and the emission wavelength have an equal magnitude and the correction factor a=2.

As an alternative thereto, the excitation wavelength and the emission wavelength differ from one another and the correction factor a is calculated as:

$$a = \frac{\lambda_{em}^2 + \lambda_{ex}^2}{\lambda_{em}^2}.$$

Here, $\lambda_{ex}$ denotes the excitation wavelength and $\lambda_{em}$ denotes the emission wavelength. This correction factor supplies the precisely desired result, provided that a microscopy apparatus, which is used to carry out the method, has the same imaging properties, point spread functions (PSF) and optical transfer functions (OTF) for both used wavelengths, apart from precisely the influence of the wavelength of the aforementioned variables. Here, the point spread function is the image of a point light source and the optical transfer function is the Fourier transform of the point spread function.

In most cases, a sufficiently good quality of the obtained raw image is achieved by the approximation that these variables are identical for the excitation wavelength and the emission wavelength. This holds all the more since the difference between the two wavelengths is relatively small in the case where the excitation wavelength and the emission wavelength are different.

If the microscopy apparatus is intended to have significantly different imaging properties for the two employed wavelengths, the correction factor a must be adapted accordingly in order to account for these circumstances.

Advantageously, the correction factor a is selected in such a way that a microscope image of a test object has a minimum full width at half maximum, wherein the test object has a diameter that is smaller than the excitation wavelength. This accounts for the different imaging properties. In practice, the correction factor a can be set by virtue of an object being imaged initially and, subsequently, the optics, i.e. the different optical components, being displaced and adjusted in such a way until the desired property is obtained. By way of example, this can also be obtained by virtue of setting an image of a different test object, which may also have larger dimensions than the excitation wavelength, "in focus". In general, this also allows the correction factor a to be set to the desired value. However, this adjustment can be carried out more accurately if use is made of a virtually punctiform object, which is smaller than the excitation wavelength. Thus, it is not mandatory in fact to create a microscope image of such a small test object for the purposes of setting the correction factor. It is sufficient in a method in accordance with this exemplary embodiment of the invention for the correction factor a to be set to the desired value. The manner in which this is carried out is irrelevant.

Advantageously, the emission light passes over part of the beam path, over which the excitation light passes, in the reverse direction and it is then guided through a beam splitter, as a result of which the emission light leaves the beam path of the excitation light. For excitation wavelengths and emission wavelengths that are different from one another, in particular, this can be achieved in a particularly simple manner by a dichroic beam splitter which, for example, lets excitation light with the excitation wavelengths pass through in a straight line and which deflects emission light with the emission wavelength and therefore removes the latter from the beam path of the excitation light.

The emission light removed from the beam path of the excitation light is now rerouted and, for example, already guided onto the optical sensor or detector, on which the scanning partial images are intended to be detected. In this case, it was found to be advantageous if the emission light is deflected by a deflection device with a deflection tilt mirror arrangement, wherein each scanning partial image is associated with a constant deflection tilt angle. Moreover, the excitation light is preferably deflected by a scanning device with a scanning tilt mirror arrangement for the scanning illumination, wherein each illumination spot is associated with a scanning tilt angle. As an alternative to this, the scanning device could also be e.g. a Nipkow disk which, for example, is illuminated in a stroboscopic manner. However, particularly for the case where both the scanning device and the deflection device each have a tilt mirror arrangement, a particularly simple implementation of the desired distances of the image positions on the optical sensor can be achieved by virtue of a difference between two deflection tilt angles for two different scanning partial images corresponding to the difference between the scanning tilt angles for the corresponding illumination spots multiplied by the correction factor a. In this way, the two tilt mirror arrangements can be actuated and moved synchronously in a particularly simple manner. The outlay in terms of machines for this arrangement is very small, and so, firstly, the production costs and hence also the microscopy costs are kept low and, moreover, only a few components are required, which could reduce the quality of the recorded image as a result of production errors or diffraction properties.

Advantageously, the excitation light is deflected by a scanning device with a scanning tilt mirror arrangement for the scanning illumination, wherein the excitation light is deflected out of the optical axis by a scanning tilt angle. In this case, the emission light is guided onto the scanning tilt mirror arrangement in such a way that it is deflected out of the optical axis by the scanning tilt angle multiplied by the correction factor a after the reflection at the scanning tilt mirror arrangement. As already shown, a scanning tilt angle is associated with each illumination spot. The excitation light is deflected out of the optical axis of the system by a scanning tilt angle by the scanning device or the scanning tilt mirror arrangement contained therein. Therefore, it is incident on the object to be imaged at the desired illumination spot.

Consequently, particularly in the case where the correction factor a corresponds precisely to the value 2, it is expedient to deflect the emission light, which is sent back through the objective by the object, out of the optical axis by precisely twice the scanning tilt angle. This is implemented in a particularly skillful embodiment, which is simple in terms of machines and equipment involved, by virtue of the emission light being directed back onto the scanning tilt mirror arrangement again. However, this is not implemented in a direction counter to the excitation light, which would lead to a descanning of the light. Rather, the emission light is guided onto the scanning tilt mirror arrangement in such a way that it is once again deflected out of the optical axis by the scanning tilt angle. What this achieves in a particularly simple manner is that the emission light is deflected out of the optical axis of the system by two-times the scanning tilt angle, such that it has the desired properties for the method according to the invention.

However, with this simple embodiment, it is also possible to implement correction factors a which need not correspond precisely to the value 2. To this end, the emission light is guided through a lens arrangement, which has a different focal length than, for example, the lens arrangement through which the excitation light is guided. As a result, the emission light is not incident on the scanning tilt mirror arrangement exactly at the scanning tilt angle, but at an angle which slightly deviates therefrom. The emission light is then deflected out of the optical axis by the scanning tilt angle by way of the scanning tilt mirror arrangement, and so, overall, a deflection which does not correspond to exactly twice the scanning tilt angle is generated.

In a preferred embodiment of the present invention a confocal appature can be used to filter out the part of the emission light that does not originate from the focal plane of the objective. Since in the aforementioned embodiment without a discanning of the light the intermediate focus is laterally shifted it is necessary to also use the moveable confocal aperture. However, a mechanically moveable pinhole is in most cases not fast enough to follow the very high scanning velocity. In order to be able to use a confocal appature in this case and to extract the depth-information of the emission light it is prefereable to use a digital micromirror device which act as a digital pinhole. It consists of a large number of micromirrors which can basicly be moved in a first and a second position each. This can be done in a very fast manner so that the rate of changing the mirrors and thus changing the position of the digital pinhole corresponds to the scanning rate.

The micromirrors moved into the first position will reflect incoming light such that it stays in the light path and will be sent to the scanning tilt mirror arrangement again. If a micromirror is moved into the second position it will reflect the incoming light out of the flow path and prevents this light from being sent to the scanning tilt mirror arrangement and the optical sensor. When the digital micromirror device is used as a digital pinhole only those micromirror are moved into the first position that reflect the part of the emission light that originates from the focal plane of the objective. All the other micromirrors are moved into the second position so that they reflect the incoming light that does not orginate from the focal plane of the objective out of the optical path. Depending on the scanning position the focal position the focal point is laterally shifted and with the digital micromirror device acting as a digital pinhole it is possible to follow this lateral shifting and the corresponding movement of the focal point.

It is also possible to use the digital micromirror device in such a way that only one of the micromirrors acts as the digital pinhole and is thus moved into the first position.

The invention moreover achieves the addressed object by a microscopy apparatus for carrying out such a method, which has at least one light source for emitting excitation light, a scanning device for the scanning illumination of the plurality of illumination spots, an optical sensor and a deflection device for deflecting the emission light.

Preferably, the microscopy apparatus moreover comprises a beam splitter, which is arranged and configured in such a way that the excitation light and the emission light are guided through the beam splitter in different directions and that the emission light is guided to the deflection device. The emission light, which is emitted by the object to be observed in response to the illumination with the excitation light, in this case passes over the beam path of the excitation light in the reverse sequence as far as this beam splitter. Particularly for embodiments in which the beam splitter for the excitation light is arranged in front of the scanning device such that the emission light passes through the scanning device in the reverse direction relative to the excitation light, the light is "descanned" in this manner, and so, particularly in this case, the already described actuation of a deflection tilt mirror arrangement in the deflection device, which corresponds therewith up to the correction factor a, can be implemented.

It was found to be advantageous if the beam splitter is a dichroic beam splitter. As a result of this, the excitation light and emission light can be separated from one another in a particularly simple manner in the case where the excitation wavelength and the emission wavelength differ from one another. Naturally, other beam splitters which, for example, react to different polarizations of the excitation light and emission light are also conceivable. By way of example, it is conceivable to initially polarize the excitation light by a polarization filter such that it passes through the beam splitter with a set polarization. In this case, the excitation light advantageously passes through an optical element between the beam splitter and the object, which element, for example a λ/4 plate, changes the polarization of the excitation light. The emission light, which is emitted by the object, likewise passes through this optical element on the way back to the beam splitter, and so the emission light, which is incident on the beam splitter, has a different polarization to the excitation light at the beam splitter.

Advantageously, both the deflection devices and the scanning devices each comprise a tilt mirror arrangement. As a result of this, it is possible to achieve the synchronous actuation of the various tilt mirror arrangements, as already described above, wherein the deflection tilt mirror arrangement is tilted in a manner multiplied by the correction factor a.

Particularly for the case where the beam splitter is arranged between the scanning arrangement and the object, it was found to be advantageous if the deflection device has a lens arrangement which forms a 2f optical unit. Preferably, the lens arrangement is arranged in such a way that the emission light, after passing through this lens arrangement, is incident on a second beam splitter, by means of which it is coupled back into the beam path of the excitation light such that it is incident on the scanning device thereafter. As a result of the 2f optical unit, a propagation angle of the emission light relative to the optical axis of the system is reversed. Subsequently, the emission light is coupled back into the beam part of the excitation light by the second beam splitter and it is incident on the scanning device. As a result of the propagation angle of the emission light in relation to the optical axis now having the opposite sign, the emission light is no longer "descanned" at the scanning device, but it once again obtains the tilt angle imparted by the scanning device such that it now has a propagation angle relative to the optical axis relative to the excitation light, which is twice the size of that of the excitation light. As a result, the correction factor a equals 2 is implemented, and so the emission light deflected thus can be removed from the beam path of the excitation light by way of a third beam splitter and it can be guided to the detector.

Alternatively, the emission light can also be guided through a separate scanning device after passing through the 2f optical unit, which separate scanning device ensures the necessary additional deviation of the emission light. In this case, this additional scanning device is preferably actuated in a synchronous manner with the first scanning device which, in particular, deflects the excitation light.

For the case that the correction factor a should not be exactly 2, what can be achieved by skillful selection of the lens system is that the propagation angle of the emission light is not exactly reversed to the optical axis. In this manner, a different correction factor a can also be achieved by a selection of the lens system.

The invention moreover achieves the addressed object by a deflection device for a microscopy apparatus of the type described here. In particular, it comprises the beam splitter and the deflection device, such that existing laser scanning microscopes can also be retrofitted and are therefore able to use the advantages of the invention described here.

The invention moreover achieves the addressed object by a deflection device, which is configured to guide excitation light incident through an input to a scanning device, to guide light deflected at the scanning device to a first output and to guide emission light incident through the first output to the scanning device in such a way that it is deflected out of the optical axis by the scanning device in the same direction as the excitation light. Advantageously, such a deflection device is configured to guide emission light deflected by the scanning device to a second output which is different from the first output.

By means of such a deflection device, incident excitation light, which, in particular, can be laser light, is guided to a scanning device with a scanning tilt mirror arrangement. This scanning device can be a conventional scanner, which is known from the prior art and commercially available. The incident excitation light is deflected at the scanning tilt mirror arrangement of this scanner and it is guided to a first output by way of possibly present optical elements. There may be an objective at said first output, which objective optionally can also be part of the deflection device. From there, the light illuminates the surface of an article to be imaged in a scanning manner. The emission light emitted by the article enters the deflection device through the first output. To this end, it possibly passes through the objective present, which, as already explained, may also be part of the deflection device. The emission light is now removed from the beam path of the excitation light, for example by a beam splitter, more particularly by a dichroic beam splitter, and it is guided back to the scanning device and the scanning tilt mirror arrangement within the scanning device by way of separate optical elements. In this case, this is the same scanning device to which the incident excitation light was guided previously. Unlike the descanning known from the prior art, in which the emission light incident on the scanning device is deflected back into the optical axis, the emission light is guided onto the scanning device in the present case in such a way that, by way of the scanning device and the scanning tilt mirror arrangement contained therein, it is deflected out of the optical axis in the same direction as the excitation light. In this case, it was found to be particularly advantageous if the emission light is reintroduced into the beam path of the excitation light in front of the scanning device, for example by way of a beam splitter, more particularly a dichroic beam splitter. What this ensures is that the emission light is deflected out of the optical axis by two-times the scanning tilt angle after it is deflected by the scanning device. Subsequently, the emission light deflected in this manner is advantageously guided to a second output via a further beam splitter which, more particularly, can likewise be a dichroic beam splitter, said second output differing from the first output. It is possible to arrange an optical sensor, for example a CCD camera, here, wherein said optical sensor is likewise known from the prior art and commercially available. Consequently, existing microscopes can also easily be retrofitted or upgraded by means of such a deflection device such that they can make use of the invention described here.

In order to accelerate the recording of the images, it was found to be advantageous if the methods described here are parallelized. This can be implemented by way of a so-called multi-focus arrangement, in which a plurality of illumination spots are illuminated simultaneously on the object to be imaged. On the one hand, this can be implemented by virtue of the excitation light of a single light source, for example of a laser, being subdivided into a plurality of excitation light beams. Alternatively or additionally, it is naturally also possible to have a plurality of light sources and generate a plurality of excitation light beams in this manner. Each one of the excitation light beams generated thus is now guided over the surface of the object to be imaged in a scanning manner. The emission light beams created thus, which are emitted by the object, are guided to the optical sensor, for example the CCD camera, in accordance with the method described here. Here, a partial image of the article to be imaged or a region of the article is imaged on the optical sensor by each one of the excitation light beams or the emission light beams caused by this excitation light beam.

Here, it was found to be advantageous if a separate region on the surface of the article to be imaged is scanned or illuminated in a scanning manner by each excitation light beam in order to prevent the partial images generated thereby from overlapping on the optical sensor.

As a result of the distance between the partial images increasing to a greater extent than the distance between the individual points within a partial image in the method described here, care has to be taken during the scanning illumination with a plurality of excitation light beams that this relationship also applies to partial images which are generated by different emission light beams. This can be implemented in very different ways. By way of example, one option consists of illuminating different regions of the surface of the object to be deflected in a scanning manner with different excitation light beams and guiding the different emission light beams generated in this manner to different optical sensors or, at least, to strictly separated regions of an optical sensor and subsequently processing the partial images generated in this manner in these different regions of the sensor for example using a data processing installation and placing these against one another, for example using a so-called stitching method. In this manner, it is also possible to detect objects with a relatively large area and/or it is possible to drastically reduce the time required to record an image. Here, the number of employed excitation light beams is, at least in theory, unlimited.

In order to elegantly prevent the individual partial images from overlapping on the optical sensor, use can be made of a laser controller which ensures that the laser is switched off at a suitable position such that there is no illumination of the object and hence no generation of a partial image on the optical sensor in the case of a specific scanning position. Naturally, it is also possible to prevent only individual excitation light beams, or some of these, or the emission light beams generated therefrom on the sample to be illuminated, from being incident on the optical sensor as emission light, for example by a closing stop or in a different manner. In this manner, the advantages of the multi-focus application, which, in particular, lie in the accelerated image recording, are fully implemented and, simultaneously, it is possible to obtain already a raw image being created on the optical sensor, more particularly the CCD sensor, without post processing and without post processing being required for first assessment. This is achieved by virtue of the individual partial images, which consist of emission light for each separated excitation light beam, being able to be placed exactly against one another.

Figure 2:
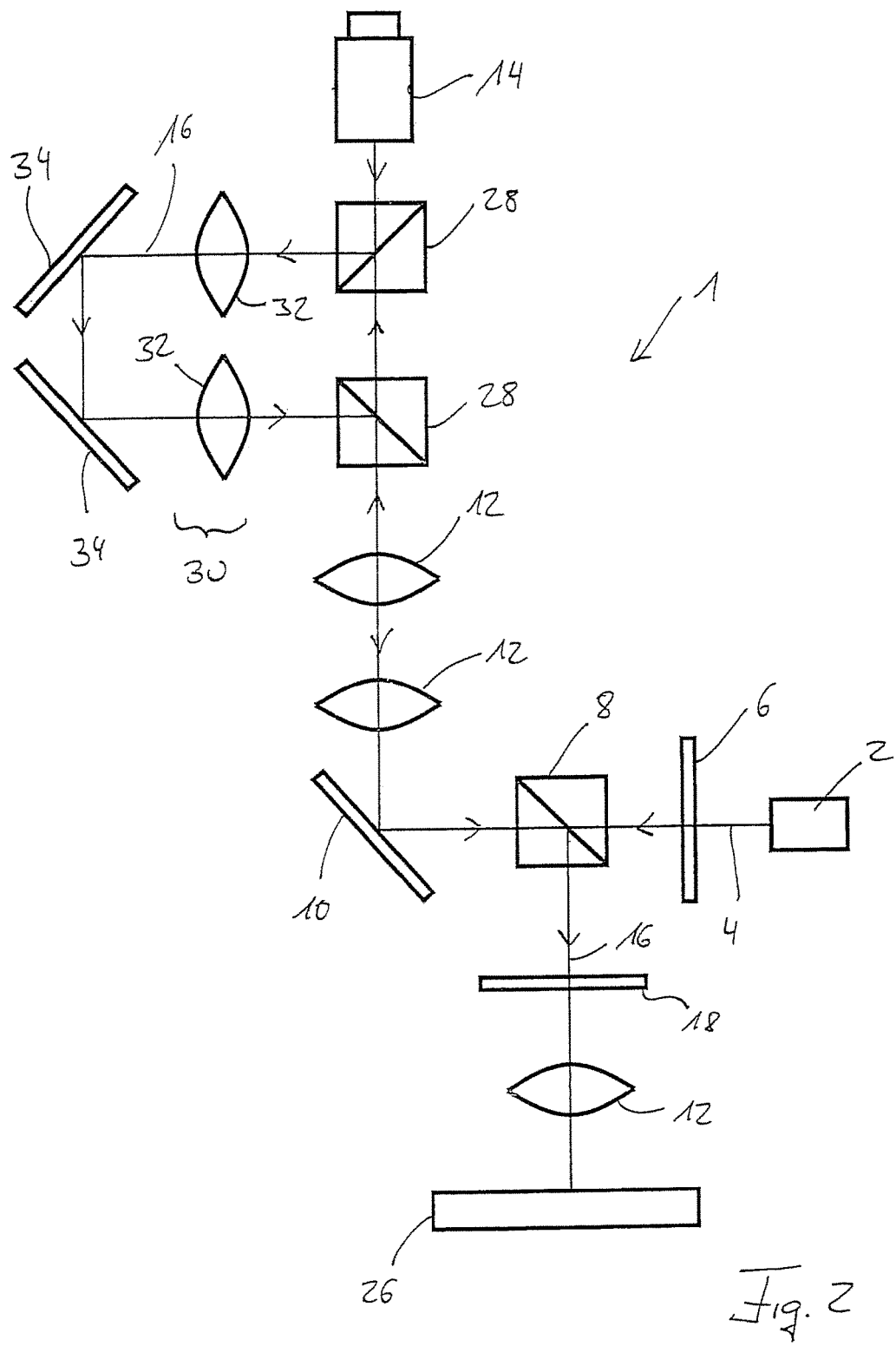
Figure 3:
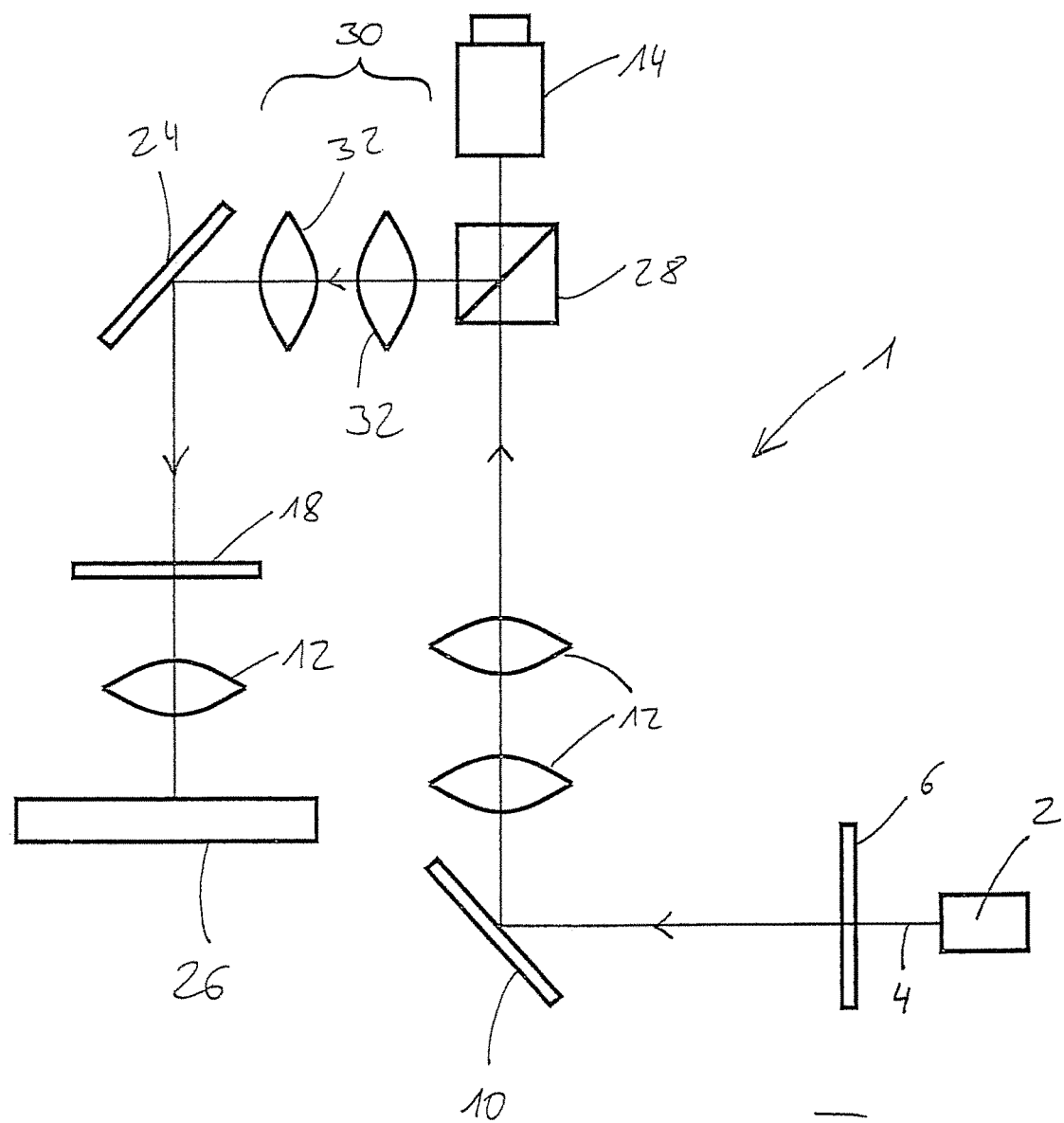
Figure 4:
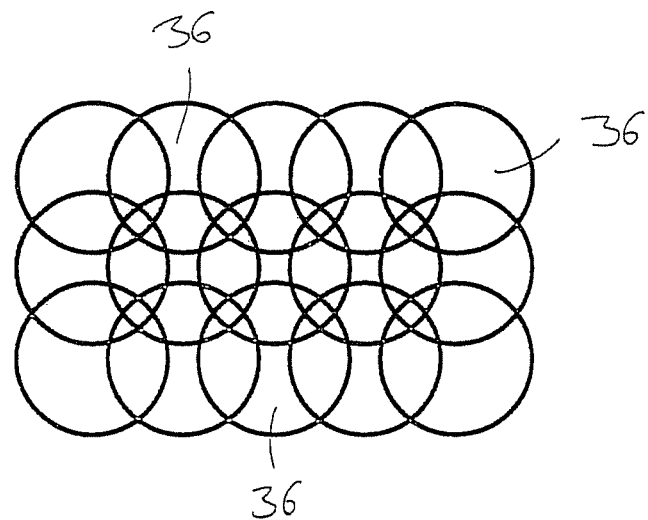
Figure 4:
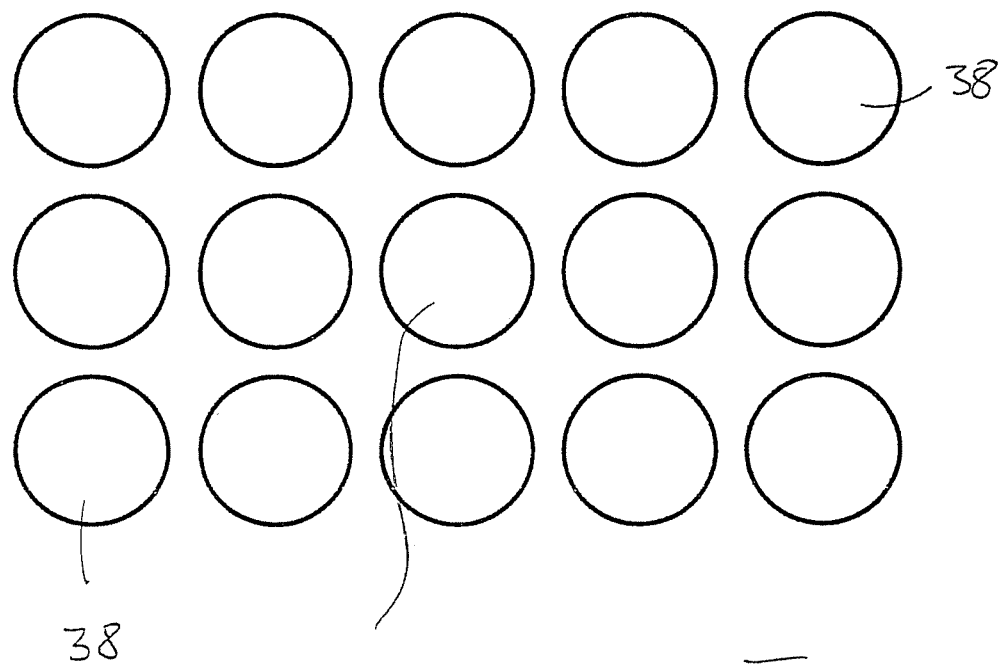
Figure 5:
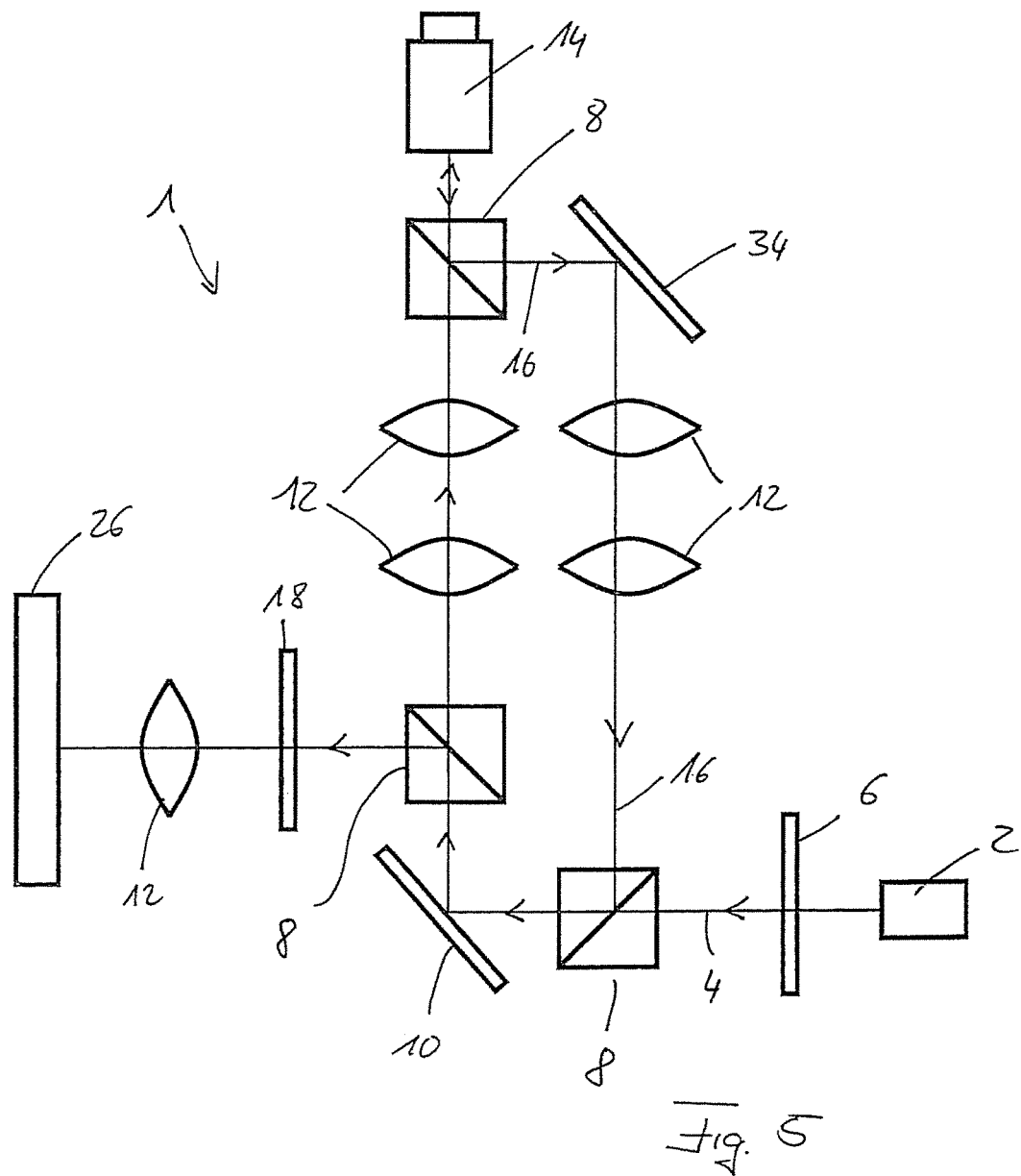
Figure 6:
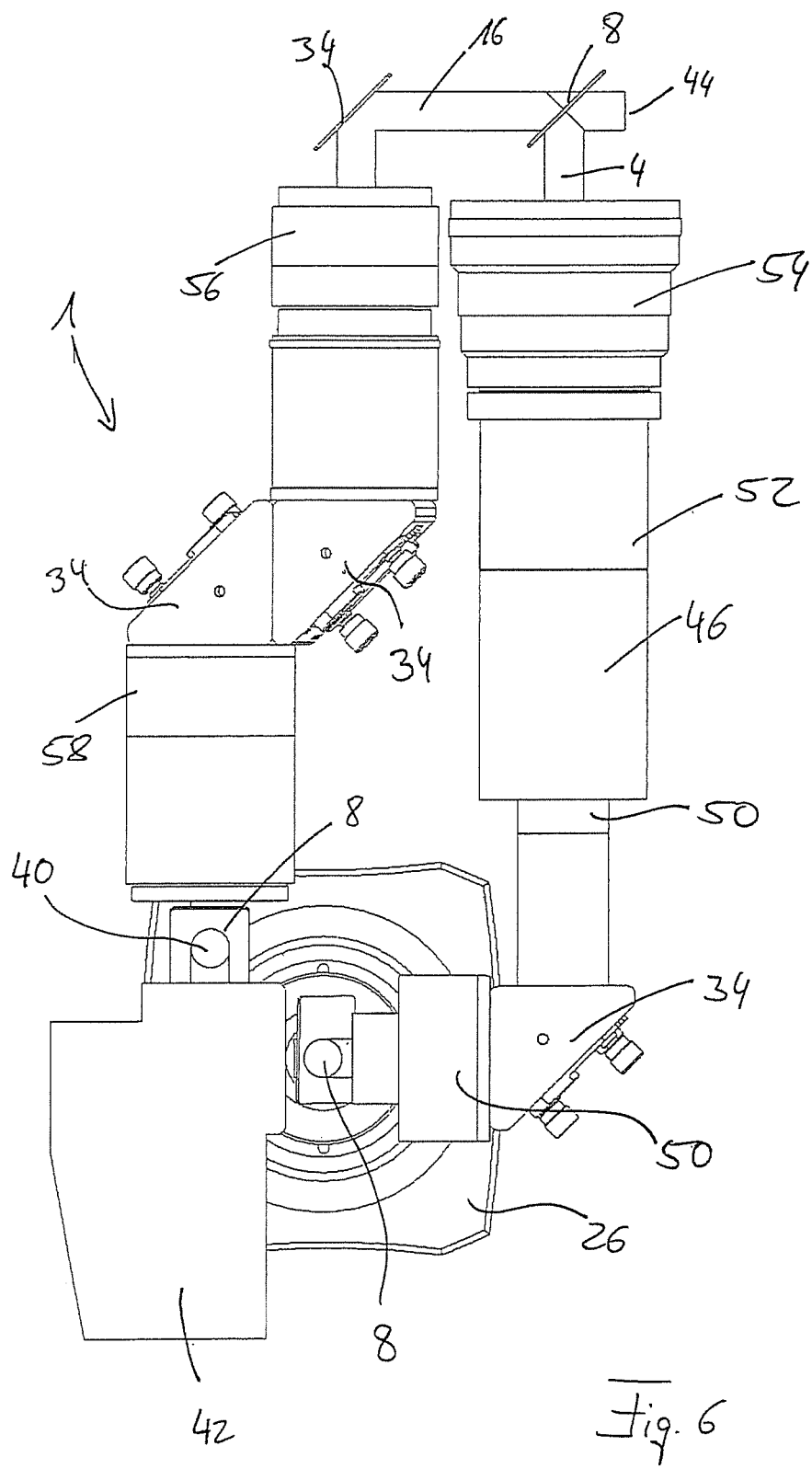
Figure 7:
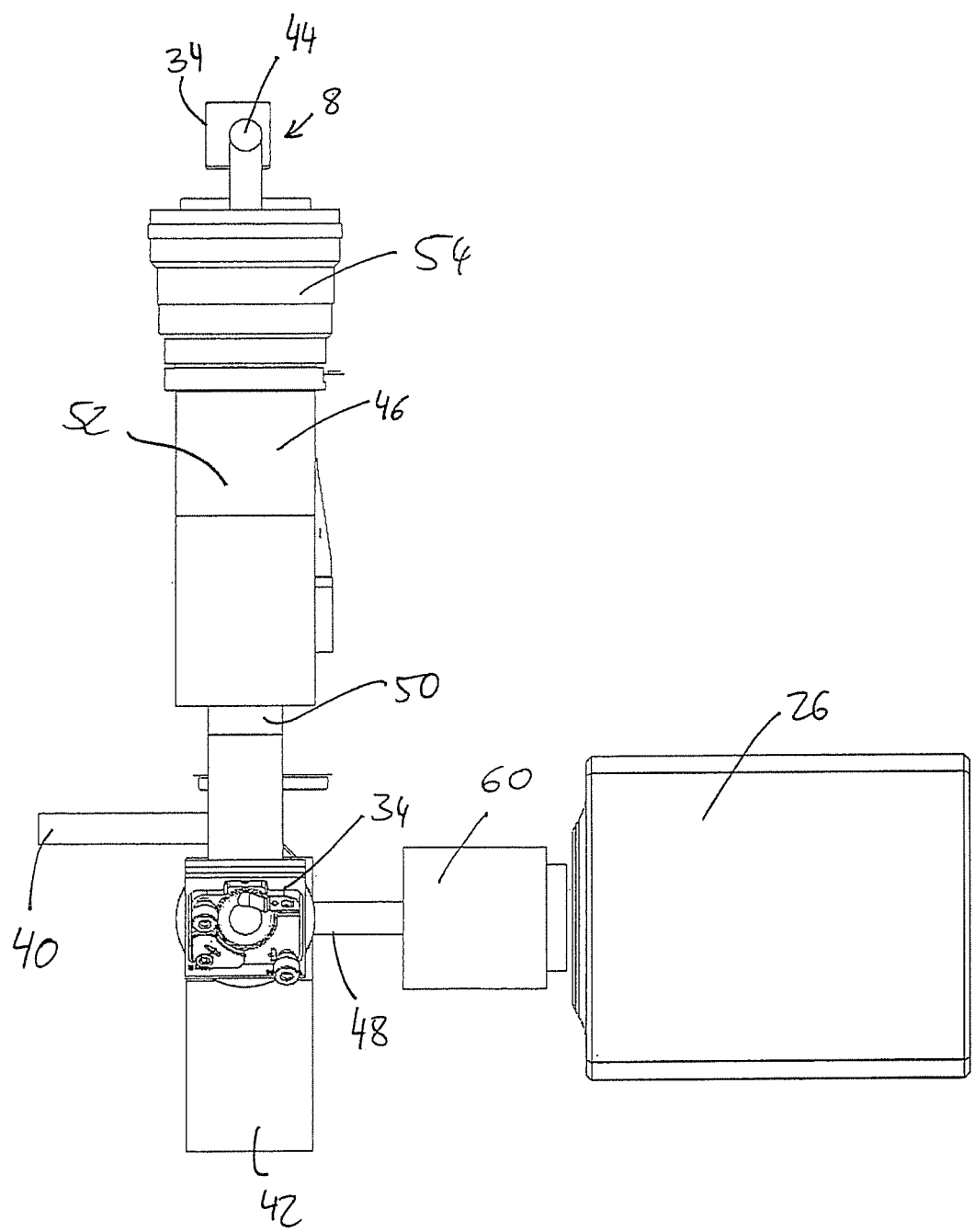
Figure 8:
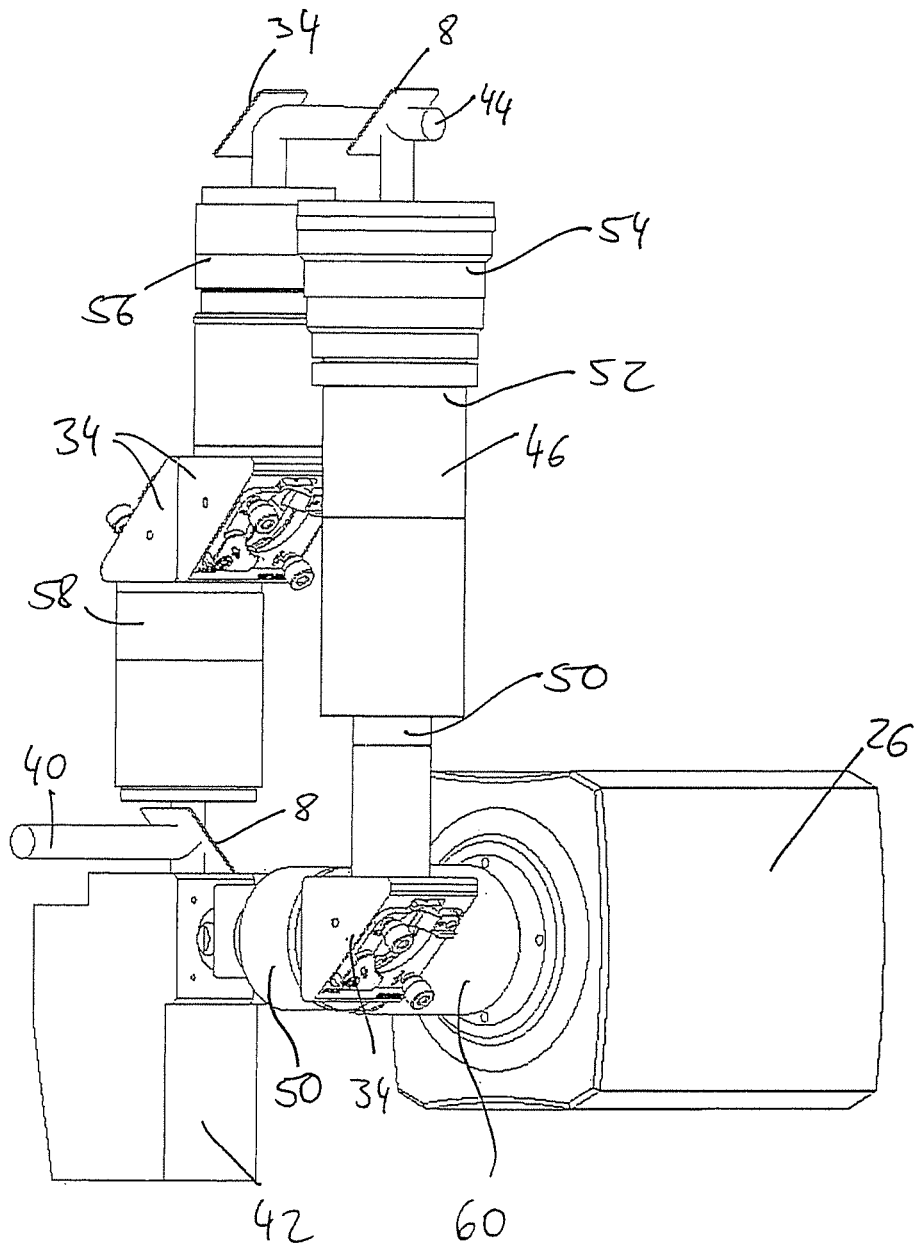

An exemplary embodiment of the present invention is explained in more detail below with the aid of the drawings. In detail:

FIG. 1 shows the schematic illustration of a microscopy apparatus in accordance with a first exemplary embodiment of the present invention, FIG. 2 shows the schematic illustration of a microscopy apparatus in accordance with a further exemplary embodiment of the present invention, FIG. 3 shows the schematic illustration of a microscopy apparatus in accordance with a further exemplary embodiment of the present invention, FIG. 4 shows the schematic illustration of scanning partial images on the optical sensor, FIG. 5 shows the schematic illustration of a microscopy apparatus in accordance with a further exemplary embodiment of the present invention, FIGS. 6 to 8 show schematic 3D illustrations of the microscopy apparatus depicted schematically in FIG. 5 from different viewing angles, and FIG. 9 shows this schematic illustration according to FIG. 5 in which a digital pinhole has been included.

FIG. 1 shows the schematic illustration of a microscopy apparatus 1 in accordance with a first exemplary embodiment of the present invention. Excitation light 4 is emitted by a light source 2, which may be e.g. a laser, and it is guided to a beam splitter 8 through an excitation filter 6. The excitation filter 6, which may be provided optionally, can filter e.g. the excitation light 4 emitted by the light source 2 in such a way that it only still contains a single excitation wavelength. The excitation light 4 passes through the beam splitter 8 and it is incident on a scanning tilt mirror arrangement 10. There, it is deflected and collimated by two lenses 12 in a rear focal plane of an objective 14. The objective 14 is displaceable along the beam direction of the excitation light 4 such that the focal plane can be displaced relative to the object to be observed (not depicted in FIG. 1) arranged downstream of the objective 14 in the beam direction. In this manner, it is possible to record recordings of the object at different axial distances.

Emission light is emitted by the object (not shown here), said emission light passing over the beam path of the excitation light 4 in the reverse direction. Consequently, it is incident on the scanning tilt mirror arrangement 10 and it is descanned here, as a result of which the tilt achieved by the scanning tilt mirror arrangement 10 is reversed. The emission light 16 reaches the beam splitter 8 and it is deflected here in such a way that it leaves the beam path of the excitation light 4 and it is incident, through a possibly present emission filter 18, at a focal lens 20, by means of which it is focused onto a confocal aperture 22. The confocal aperture 22 filters out the part of the emission light 16 that does not originate from the focal plane of the objective 14. As a result, the axial resolution of the microscope is significantly increased.

By way of a further lens 12, the emission light 16 filtered thus subsequently reaches a deflection tilt mirror arrangement 24, which deflects the emission light 16 through a further lens 12 to the optical sensor 26. The deflection tilt mirror arrangement 24 and the scanning tilt mirror arrangement 10 are advantageously actuated in parallel with one another, wherein the magnitude by means of which the deflection tilt mirror arrangement 24 is tilted corresponds to the magnitude of the tilt of the scanning tilt mirror arrangement 10, multiplied by the correction factor a. Here, the 45° deflection shown in FIG. 1 is assumed to be the zero position. However, ultimately any other deflection can also be set to the zero position.

Since the emission light 16 which is incident on the deflection tilt mirror arrangement 24 is a collimated beam, an e.g. doubling of the deflection angle from the optical axis, i.e. from the zero position (45° deflection) shown in FIG. 1, leads to a doubling of the distance of the image imaged on the optical sensor 26, and so the desired criterion is achieved. In this case, the ratio between the tilt of the deflection tilt mirror arrangement 24 and the the scanning tilt mirror arrangement 10 advantageously corresponds precisely to the correction factor a.

Prior to incidence on the optical sensor 26, the deflected emission light 16 advantageously passes through a so-called fΘ objective. What this achieves is that the deflected emission light 16 is focused on the sensor plane of the optical sensor 26. Aberrations, which are caused without such an objective as a result of the different path lengths which the deflected emission light 16 must pass over in the case of different angles of the deflection tilt mirror arrangement 24 in relation to the optical sensor 26, are avoided in this manner. It was found to be particularly advantageous if a so-called telecentric fΘ objective is used. This objective ensures that the deflected emission light 16 is focused not only in the sensor plane of the optical sensor 26, but that it is simultaneously also incident at right angles on the optical sensor 26. The use of fΘ objectives and, in particular, telecentric fΘ objectives is advantageous for all embodiments described here.

As can already be identified in FIG. 1, the system makes do with a relatively small number of optical components, and so the production and arrangement can be carried out in a cost-effective manner. The optical sensor 26, which may be e.g. a CCD camera, is read out after the complete scanning illumination of the object and the read-out image thus corresponds to an ISM raw image.

FIG. 2 shows a further embodiment of a microscopy apparatus 1 in accordance with a further exemplary embodiment of the present invention. In this case too, excitation light 4 is guided from a light source 2 to an excitation filter 6 before it is fed to the beam splitter 8. The excitation light 4 passes through the beam splitter 8 in a straight line and it is guided, like in the exemplary embodiment shown in FIG. 1, to the rear focal plane of the objective 14 by way of the scanning tilt mirror arrangement 10 and the corresponding lenses 12. However, in contrast to the embodiment shown in FIG. 1, the excitation light 4 passes through two further beam splitters 28, without, however, being deflected thereby.

Emission light 16 is emitted by the object likewise not shown in FIG. 2, which emission light is deflected by the first beam splitter 28, on which it is incident, such that it is incident on a lens system 30 which, in particular, has two system lenses 32. Together, the system lenses 32 form a so-called 2f optical unit, which reverses a propagation angle of the emission light 16 relative to the optical axis. Only the direction of the light is changed by two deflection mirrors 34.

The lower beam splitter 28 shown in FIG. 2 couples the emission light 16, now having the reversed angle relative to the optical axis, back into the beam path of the excitation light 4 such that said emission light is incident on the scanning tilt mirror arrangement 10. However, unlike the exemplary embodiment shown in FIG. 1, the emission light 4 is not descanned here, but the deflection angle of the emission light is doubled relative to the optical axis of the system by the renewed deflection by means of the scanning tilt mirror arrangement 10.

The emission light 16 deflected thus reaches the beam splitter 8 and it is deflected by the latter. The emission light 16 is now guided to an optical sensor 26 through an emission filter 18 and a further lens 12. Like in the exemplary embodiment shown in FIG. 1, the tilt angle of the emission light 16 relative to the optical axis of the system is consequently doubled or, as required, multiplied by the correction factor a in relation to the tilt angle of the excitation light 4 in the example shown in FIG. 2 as well. In the exemplary embodiment shown in FIG. 2, this is achieved by a skillful selection of the system lenses 32. While a confocal microscope arrangement is depicted in the exemplary embodiment shown in FIG. 1, the embodiment shown in FIG. 2 makes do without a focus lens and a confocal aperture.

In this case, a deflection device for a microscopy apparatus 1 in accordance with one of the two exemplary embodiments comprises, in particular, the part which ensures a deflection of the emission light 16 relative to the excitation light 4. In an embodiment in accordance with FIG. 1, such a deflection device could comprise e.g. the deflection tilt mirror arrangement 24 and, optionally, an electrical controller which is configured to actuate the tilt mirror arrangement 24 in accordance with the method. In an embodiment in accordance with FIG. 2, it is sufficient for the deflection device to comprise the two beam splitters 28 and the lens system 30 and, optionally, the deflection mirrors 34. Such deflection devices can be installed in existing microscopy apparatuses and the latter can therefore be retrofitted.

FIG. 3 shows a further schematic illustration of a microscopy apparatus 1 in accordance with a further exemplary embodiment of the present invention. The excitation light 4 emitted by the light source 2 passes through the excitation filter 6 and it is deflected by the scanning tilt mirror arrangement 10. After it has passed through the lenses 12 and the beam splitter 28, it is guided by the objective 14 onto the object to be imaged (not shown in FIG. 3). The emission light 16 emitted by the object once again passes over part of the beam path of the excitation light 4 in the reverse direction, but it is removed from the beam path of the excitation light 4 by the beam splitter 28 in the exemplary embodiment shown in FIG. 3, like in the arrangement shown in FIG. 2, and it passes through the lens system 30 consisting of the two system lenses 32. Like in the exemplary embodiment shown in FIG. 2, the lens system 30 is a 2f optical unit, such that, in this case too, the propagation angle of the emission light 16 relative to the optical axis is reversed. Like in the exemplary embodiment shown in FIG. 2 as well, an incomplete reversal of this angle can also be achieved by skillful selection of the system lenses 32, as a result of which correction factors a which are unequal to the value of 2 can be realized.

However, in the exemplary embodiment shown in FIG. 3, the emission light 16 deflected thus is not coupled back into the beam path of the excitation light 4; instead, it is directly incident on the deflection tilt mirror arrangement 24 which, in this case, is actuated synchronously with the scanning tilt mirror arrangement 10. Subsequently, said emission light passes through the emission filter 18 and a further lens 12, before it is incident on the optical sensor 26. Compared to the embodiment shown in FIG. 2, the embodiment shown in FIG. 3 is advantageous in that, particularly in the case where the excitation light 4 and the emission light 16 comprise different wavelengths, the various passed-through lenses and tilt mirror arrangements 10, 24 can be selected and embodied in a manner optimized with respect to the respective wavelength. However, a disadvantage in comparison with the embodiment shown in FIG. 2 is that the two tilt mirror arrangements 10, 24 must be actuated and tilted synchronously with one another in order to achieve ideal imaging on the optical sensor 26. In the embodiment shown in FIG. 2, this is achieved automatically by virtue of both the excitation light 4 and the emission light 16 passing over the same tilt mirror arrangement 10.

In the embodiments depicted here, the various lenses 12, 32 are depicted as simple convex lenses. Naturally, this is a simplified representation. In order to be able to compensate for aberrations, coma, etc., use can be made here, in particular, of special optics adapted specifically to the respective wavelength of the excitation light 4 or the emission light 16.

FIG. 4 schematically shows how illumination spots 36 can be arranged on the object to be observed. This is depicted in the upper region of FIG. 4. It is possible to identify that the illumination spots 36 are circular illumination spots which overlap one another and which are arranged on a square grid with a fixed distance from one another. Conventionally, the corresponding scanning partial images would be arranged in an analogous and merely magnified manner on the optical sensor 26 for the purposes of imaging the emission light 16 emitted from these illumination spots 36. Therefore, the scanning partial images 38 must also overlap on the optical sensor 26. However, this is not necessarily the case in a method according to the invention, as depicted in the lower region of FIG. 4. It is possible to identify that the scanning partial images 38 have the same arrangement as the illumination spots 36. The scanning partial images 38 are also arranged relative to one another on a square grid. However, the image distances between the center points of the scanning partial images 38, the so-called image positions, have been multiplied by the correction factor a, which is greater than 1. Therefore, what is achieved in this shown exemplary embodiment is that the scanning partial images 38 do not overlap one another. What is achieved by the skillful selection of the correction factor a is that an overall image, composed of all scanning partial images 38 put together and recorded in this manner by the optical sensor 26, is already the ISM raw image, which can subsequently be numerically postprocessed in a manner known from the prior art.

What is decisive in this case is that although the distance between the scanning partial images 38 is magnified beyond the desired magnification, the individual scanning partial images 38 are not once again scaled by the correction factor a. Consequently, each scanning partial image 38 corresponds to the emission light 16 emitted from the corresponding illumination spots 36, which is depicted in a manner magnified by the desired magnification.

FIG. 5 schematically shows a microscopy apparatus 1 in accordance with a further exemplary embodiment of the present invention. By means of the apparatuses already depicted in FIGS. 1 to 3, excitation light 4 is guided from the light source 2 through an excitation filter 6 and it passes through the first beam splitter 8, before it is incident on the scanning tilt mirror arrangement 10. From there, it passes through a further beam splitter 8 without being influenced, the two lenses 12 for the illumination beam path and a third beam splitter 8, by means of which it is likewise not influenced. Subsequently, it is incident on the objective 14 and, from there, on the object not shown in FIG. 5 either.

Emission light 16 enters into the apparatus through the objective 14 and it is deflected out of the path of the excitation light 4 by way of the beam splitter 8. It is incident on the deflection mirror 34 and passes through both lenses 12 for the emission beam path, which lenses have the same effect on the emission light 16 as the two lenses 12 through which the excitation light 4 passes. Here, the focal lengths of the lenses 12 of the emission beam path can differ from the focal lengths of the lenses 12 for the illumination beam path. A correction factor a unequal to 2 can be set by suitable selection of the focal lengths. However, the lenses 12 through which the emission light 16 passes are matched and optimized to the emission wavelength. Subsequently, the emission light 16 is once again incident on the first beam splitter 8 and it is coupled back into the beam path of the excitation light 4 by the latter. Consequently, it is once again incident on the scanning tilt mirror arrangement 10 and, unlike in e.g. the exemplary embodiment shown in FIG. 1, it is once again deflected out of the optical axis of the system by a scanning tilt angle. The emission light 16 is once again removed from the beam path of the excitation light at the next beam splitter 8, through which the emission light 16 and excitation light 4 pass, and it is guided to the emission filter 18, a further lens 12 and, subsequently, the optical sensor 26.

The advantage of this embodiment lies in the fact that both the emission light 16 and the excitation light 4 pass through the scanning tilt mirror arrangement 10 of the scanning device in the same direction, preferably even along the same light path, and therefore the emission light 16 is subject to twice the scanning tilt angle of the excitation light 4 in a particularly simple manner. It is therefore unnecessary to design complicated lens systems, as is the case, for example, in the exemplary embodiment shown in FIG. 2, or to provide an additional scanner in the form of a deflection tilt mirror arrangement 24, which needs to be operated synchronously and parallel to the scanning tilt mirror arrangement 10.

FIGS. 6 to 8 show technical drawings from different viewing angles of a specific embodiment on the basis of the apparatus schematically depicted in a simplified manner in FIG. 5. Excitation light 4 which, in particular, is collimated laser light enters the microscopy apparatus 1 through the input 40. In the view shown in FIG. 6, it is initially deflected downward onto a scanner 42, in which the scanning tilt mirror arrangement 10 is situated, by way of a beam splitter 8 (not depicted here). After the excitation light 4 was deflected out of the optical axis at the scanning tilt mirror arrangement 10, for example by an angle α, it passes through the beam splitter 8 and is fed to a further beam splitter 8 by way of a deflection mirror 34. The latter is depicted at the top in FIG. 6 and it deflects the incident excitation light 4 to the right in FIG. 6, where a first output 44 is situated. Situated in front of and behind the deflection mirror 34 there is a relay lens 50 in each case, which relay lenses invert the deflection angle α. The pivot point of the beam deflection is imaged in the work plane of a scanning lens 52, which is part of the beam guidance 46. The focus generated by this scanning lens 52 is re-collimated by a tube lens 54 and guided to the output 44 by way of the already mentioned further beam splitter 8. An objective 14 (not shown in FIG. 6) can be situated at said output, by means of which objective the excitation light 4 is guided to an object (likewise not depicted here). The beam splitters 8 are preferably dichroic mirrors.

Subsequently, emission light 16 enters the shown apparatus through the first output 44 and it passes through the beam splitter 8 without being deflected. In the process, some of the emission light 16 is collimated by the objective in such a way that the axis of the emission light 16 is identical to that of the excitation light 4. In particular, the beam splitters 8 are dichroic beam splitters, which are always expedient if the excitation light 4 and the emission light 16 have different wavelengths. The emission light 16 is incident on a further deflection mirror 34 and guided through a second tube lens 56. The focus created in the process is mirrored by way of a pair of deflection mirrors 34 onto the optical axis of the scanner 42, which may be e.g. a galvano scanner, in such a way that the beam axis and the optical axis of the scanner 42 are identical for a deflection angle α=0. A second scanning lens 58 collimates the beam and deflects it onto the scanner 42 at an angle −β. The emission light 16 obtains a further deflection by the angle α by the scanner 42 and consequently leaves the scanner 42 at an angle of γ=α+β. This deflected emission light is guided onto a third tube lens 60 by the beam splitter 8 which records the pixel on the optical sensor 26.

Consequently, the emission light 16 is deflected downward in the shown exemplary embodiment, i.e. perpendicular to the plane of the drawing, and there it is incident on the schematically depicted optical sensor 26, which can be e.g. a commercially available camera. FIG. 8 shows the illustration from FIG. 6 tilted by 90 degrees. It is possible to identify the input 40, through which excitation light 4 enters into the apparatus.

In FIG. 7, this excitation light 4 is deflected downward in the direction of the scanner 42 before it is fed to the tilt mirror 34 and the further beam guidance 46. From the latter, it emerges and it is guided to a beam splitter 8 (not shown here), from which it is deflected upward out of the plane of the drawing. Consequently, the view depicted in FIG. 7 shows the viewing direction into the first output 44. It is moreover possible to identify the deflection mirror 34 lying below this input 44, by means of which deflection mirror the emission light 16, which enters the apparatus through the first output 44, is deflected. This emission light 16 is also fed to the scanner 42 and it leaves the deflection device through the second output 48 (not depicted in FIG. 6), which extends downward out of the plane of the drawing in FIG. 6. The emission light reaches the camera or the optical sensor 26 by way of this second output 48.

FIG. 8 shows an oblique view of the apparatus shown in FIGS. 6 and 7. Neither a light source 2 nor an objective 14 is depicted in FIGS. 6 to 8. Here, the deflection device itself comprises all elements depicted in FIGS. 6 to 8, with the exception of the optical sensor 26. Using such a deflection device, it is easily possible to refit existing microscopes such that these can make use of the concept according to the invention.

The arrangement shown in FIGS. 6 to 8 has a number of advantages. By decoupling the beam path for the excitation light 4 and the emission light 16, a simple and independent adjustment of the arrangement is made possible. The adjustment for the excitation light 4 can be optimized by virtue of, for example, use being initially made of an independent detection of a fluorescence signal, for example with the aid of a non-descanned detector. Since this part of the arrangement is only used for excitation light 4, no trade-offs have to be made in this case for detecting this light. In a second step, there can be a fine adjustment of the detection beam path, through which the emission light 16 is guided. The image position on the optical sensor can easily be optimized by the two deflection mirrors 34. Independently thereof, the collimation of the emission light 16 can be optimized by displacing the second scanning lens 58 relative to the second tube lens 56.

The separately guided beam path for the emission light 16 can moreover be optimized to the spectral properties of the emission light 16 which, in particular, depend on the fluorescence and the sample. This advantage is of particular importance, particularly in the case of a two-photon excitation, since optical components which are equally optimized for the visible spectral range and the near infrared spectral range are not available. Consequently, the shown embodiment provides a significantly improved performance in addition to the simplified handling and adjustment.

Additionally, the whole shown arrangement as a deflection device can be integrated into already existing microscopes or it can be attached to corresponding microscopes. There is no restriction, as a matter of principle, in respect of compatibility with specific producers. Furthermore, the other functions of an employed microscope are not restricted either by the deflection device if it is integrated in a suitable manner.

FIG. 9 corresponds to the schematic illustration of FIG. 5. The only difference is that in the path of the emission light 16 after the first lens 12 there is a digital micromirror device 62. It is denoted with a dashed line. It comprises a large number of micromirrors which each can be positioned in a first position and a second position. In the first position the micromirrors reflect the incoming emission light 16 in the way denoted in FIG. 9. When a micromirror is positioned in the second position it reflects incoming light into another direction so that this light does not contributed to the image on the optical sensor 26. After the light has been guided to the digital micromirror device 62 and has been reflected by those micromirrors that are positioned in the first position the emission light 16 reaches an additional mirror 64 which reflects the light onto the next lense 12 and the beam splitter 8 before the emission light is guided to the scanning tilt mirror arrangement 10 again.

The digital micromirror device 62 has to be positioned in the focal plane which usually is positioned in the middle between the two lenses 12 which are shown in the optical path of the emission light 16 before and after the digital micromirror device 62 and the additional mirror 64. The digital micromirror device 62 is shown in an orientation perpendicular to the optical path. Only some of the micromirrors that are positioned in the correct position deflect the incoming emission light 16 in the direction shown in FIG. 9. Please note, that position and orientation of the digital micromirror device 62 are shown in the simplified form.

The invention claimed is:

1. A microscopy apparatus for creating a microscope image of at least part of an object, comprising
  a light source for emitting excitation light;
  a scanning device for providing scanning illumination of a plurality of illumination spots at the object by way of the excitation light, wherein the scanning device is configured to deflect incident light out of an optical axis of the microscopy apparatus by nonzero scanning tilt angles;
  an optical sensor for detection of a scanning partial image with a predetermined magnification for each illuminated illumination spot, wherein emission light is emitted at the respective illumination spot by the object as a reaction to the illumination with the excitation light, wherein each respective illumination spot is associated with a particular scanning tilt angle; and
  a deflection device configured to
    guide the excitation light to the scanning device,
    guide the excitation light deflected at the scanning device to a first output, and
    guide the emission light incident through the first output to the scanning device,
  wherein the deflection device and the scanning device are configured such that both the emission light and the excitation light pass through the same scanning device in the same direction and therefore the emission light for the respective illumination spot is subject to twice the particular scanning tilt angle of the excitation light,
  wherein the deflection device has a lens arrangement which forms a 2f optical unit,
  wherein the lens arrangement is arranged in such a way that the emission light, after passing through the lens arrangement, is incident on a second beam splitter, by means of which it is coupled back into the beam path of the excitation light such that it is subsequently incident on the scanning device.

2. The microscopy apparatus of claim 1, wherein the deflection device configuration which guides the emission light incident through the first output to the scanning device is not configured to guide the emission light in a direction counter to the excitation light, which would lead to a descanning of the emission light.

3. The microscopy apparatus as claimed in claim 1, wherein the deflection device is configured such that both the emission light and the excitation light pass through the same scanning device in the same direction along the same light path.

4. The microscopy apparatus as claimed in claim 1, further comprising a beam splitter, which is arranged and configured in such a way that the excitation light and the emission light are guided through the beam splitter in different directions and that the emission light is guided to the deflection device.

5. The microscopy apparatus as claimed in claim 4, wherein the beam splitter is a dichroic beam splitter.

6. The microscopy apparatus as claimed in claim 1, wherein the deflection device and the scanning device each have a tilt mirror arrangement.

* * * * *